(12) United States Patent
Dehghan et al.

(10) Patent No.: US 6,782,043 B1
(45) Date of Patent: Aug. 24, 2004

(54) METHOD AND APPARATUS FOR ESTIMATING THE LENGTH OF A TRANSMISSION LINE

(75) Inventors: Hossein Dehghan, Danville, CA (US); Dariush Dabiri, San Jose, CA (US); Jing Li, Mountainview, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/484,630

(22) Filed: Jan. 18, 2000

(51) Int. Cl.[7] .............................................. H04B 17/00
(52) U.S. Cl. ...................... 375/224; 375/348; 375/288; 375/229; 375/133
(58) Field of Search ................................ 375/224, 133, 375/229, 233, 232, 288, 348, 377

(56) References Cited

U.S. PATENT DOCUMENTS

| | | | | |
|---|---|---|---|---|
| 5,519,727 A | * | 5/1996 | Okanoue et al. | ............ 375/232 |
| 5,946,351 A | * | 8/1999 | Ariyavisitakul et al. | .... 375/233 |
| 6,317,495 B1 | * | 11/2001 | Gaikwad et al. | ............ 379/417 |
| 6,538,451 B1 | * | 3/2003 | Galli et al. | ................. 324/533 |
| 2001/0043647 A1 | * | 11/2001 | Belge | ......................... 375/222 |

OTHER PUBLICATIONS

Naguib et al. ("Adaptive Channel Equalization For TDMA Digital Cellular Communications Using Antenna Arrays"Acoustics, Speech, and Signal Processing, 1994. ICASSP–94., 1994 IEEE International, Conference on , vol.: iv , Apr. 19–22, 1994, Page(s): IV/101).*

* cited by examiner

Primary Examiner—Stephen Chin
Assistant Examiner—Guillermo Muñoz
(74) Attorney, Agent, or Firm—Westman, Champlin & Kelly

(57) ABSTRACT

A method and apparatus for estimating the length of a transmission line is provided. The transmission line extends between a transmitter and a receiver and has a low-pass filter characteristic and an impulse response. The method and apparatus receive a data signal from the transmission line at the receiver and estimate the length of the transmission line as a function of the received data signal and the impulse response.

16 Claims, 2 Drawing Sheets

METHOD AND APPARATUS FOR ESTIMATING THE LENGTH OF A TRANSMISSION LINE

BACKGROUND OF THE INVENTION

The present invention relates to data transmission channels and, more particularly, to a method and apparatus for estimating the length of a transmission line having a low-pass filter characteristic.

In a typical Communication system, analog signals are transmitted from a transmitter to a receiver through a transmission channel. A typical receiver includes an amplifier, an analog-to-digital (A/D) converter and an automatic gain controller. The amplifier amplifies the received AC analog signal, which is then converted by the A/D converter into a series of digital values that can be processed. The automatic gain controller monitors the signal power and adjusts the amplifier gain to restore the received signal to desired power level.

Various types of channels have been used, such as "twisted pair" wire line channels. Such channels are commonly used in digital subscriber loops, home, local and wide area networks, and other applications. It is often desired to have the transmitter or receiver optimized for the length of the channel to mitigate channel effects, such as attenuation of the data signals being passed through the channel.

An existing method of estimating the length of a twisted pair wire line channel is to observe and estimate the received signal power. With this method, the receiver contains a power estimation circuit, which is essentially a power meter, that approximates the signal strength at the receiver. Taking advantage of the fact that the received signal power, $P_r$, is effected by attenuation of the signal in the cable, which increases with cable length, the received signal power estimate is translated to a channel length estimate Equation 1 shows that the channel length estimate, L, is a function of the received signal power, $P_r$:

$$L=f(P_r) \qquad \text{Eq. 1}$$

The existing method takes advantage of the relation between received signal power and cable length and it drives the cable length estimate from the received signal power, assuming that longer cables introduce more attenuation and hence lower signal strength at the receiver.

The inventors of the present application have found that the main disadvantage of the existing method is that it does not account for fluctuations and variations in the received signal power level due to sources other than cable attenuation. Such sources can include variable gain amplifier (VGA) and/or automatic gain control (AGC) power error, $P_{agc}$, cable connector loss $P_c$ and cable-termination mismatch, $P_m$. The signal power at the receiver can be characterized by:

$$P_r = P_a + P_{agc} + P_c + P_{m+} \qquad \text{Eq. 2}$$

where $P_r$ is the total signal power reduction and $P_a$ is the reduction in received signal power by attenuation in the cable channel due to Inter-Symbol Interference (ISI) or the low-pass filter nature of a twisted pair cable. The non-cable-attenuation sources of power reduction can be significant, which results in an inaccurate estimate of the cable length. This is especially true for shorter cables where $P_a$ can be much smaller than the other non-cable-attenuation, length independent sources of power reduction.

Improved methods and devices for more accurately and efficiently estimating the cable length in a data transmission channel having a low-pass filter characteristic are desired.

SUMMARY OF THE INVENTION

One aspect of the present invention relates to a method of estimating the length of a communications channel transmission line that extends between a transmitter and a receiver and has a low-pass filter characteristic and an impulse response. The method includes receiving a data signal by the receiver from the transmission line and estimating the length of the transmission line as a function of the data signal received by the receiver and the impulse response.

Another aspect of the present invention relates to a channel length estimator, which includes a channel input for coupling to a transmission line having a length. A decision feedback equalizer is coupled to the channel input and includes a plurality of steady-state feedback tap coefficients and an equalizer output. A power estimator is coupled either to the steady-state feedback tap coefficients or to the equalizer output and has an estimated power output. A channel length mapping circuit is coupled to the estimated power output and is adapted to map the estimated power output to an estimate of the transmission line length. Yet another aspect of the present invention relates to a data communications receiver for coupling to a transmission line that has a low-pass filter characteristic and an impulse response. The receiver includes a receiver input, which is adapted to receive a data signal from the transmission line, a receiver output and a detected symbol flow path from the, receiver input to the receiver output. The receiver further includes a length estimator coupled to the detected symbol flow path for estimating the length of the transmission line as a function of the data signal received from the transmission line and the impulse response.

DETAILED DESCRIPTION OF THE PREFERRED EMBODIMENTS

Figure 1:
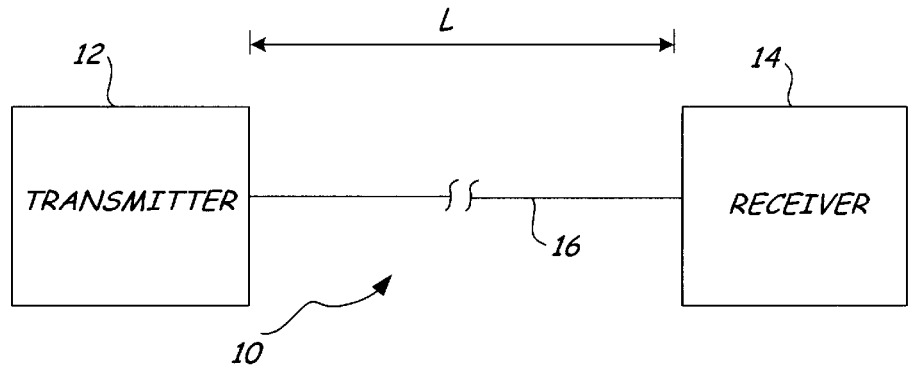
FIG. 1 is a block diagram of a data communication system according to one embodiment of the present invention.

FIG. 1 is a block diagram of a data communication system according to one embodiment of the present invention. Data communication system 10 includes a transmitter 12, a receiver 14 and a channel 16 for passing data from transmitter 12 to receiver 14. Channel 16 can include any type of channel having a low-pass filter characteristic. For example, channel 16 can include a single-ended transmission line "wire" or a pair of differential transmission line "wires", such as a typical Cat-5 "twisted-pair" cable. Several types of transmission lines exhibit low-pass filter characteristics, such as those with copper wires, copper composite wires and wires with other similar materials.

Certain functions in receiver 14 require a knowledge of the length, L, of channel 16. As discussed above, existing methods and algorithms for estimating the channel length L are based on an estimate of the received signal power at receiver 14. These methods do not account for inaccuracies in the channel length estimate due to sources of signal power reduction that are not related to attenuation within channel 16.

With the present invention, the length L of channel 16 is estimated as a function of the impulse response of channel 16, rather than an estimate of the total power reduction as shown in Equation 2 above. The length L of channel 16 is uniquely a function of the cable's attenuation only, as provided in the following equation:

$$L = g(P_a) \qquad \text{Eq. 3}$$

When looking at the cable's impulse response, it has been found that the cable's attenuation, and thus the cable length, is a unique function of the post-cursor (after the initial pulse) portion of the impulse response, which is known as the Inter-Symbol Interference (ISI) magnitude.

Figure 2:
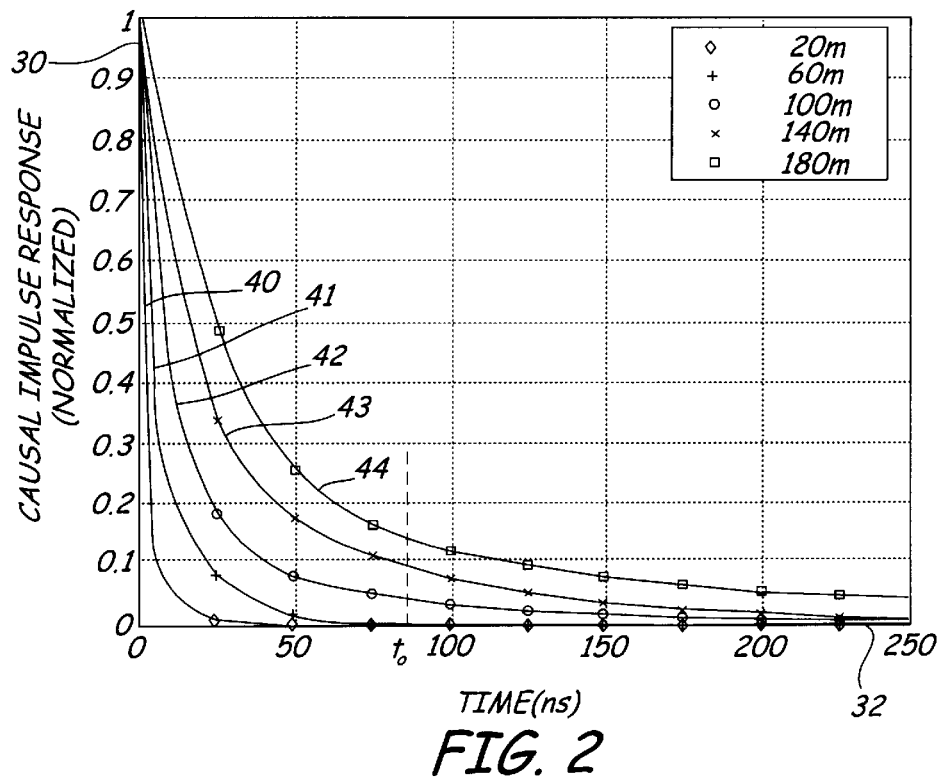
FIG. 2 is a graph showing normalized impulse response of a typical Cat-5 twisted pair cable for various lengths.

FIG. 2 is a graph showing the normalized impulse response of a typical Cat-5 twisted pair cable for various lengths. Y-axis 30 represents the normalized causal impulse response (CIR), and X-axis 32 represents time in nanoseconds. Lines 40–44 represent the normalized CIR of Cat-5 twisted pair cables having lengths of 20 meters, 60 meters, 100 meters, 140 meters and 180 meters, respectively. For each line 40–44, the entire curve represents a combination of the pulse itself, at t=0, and the ISI, after t=0. The impulse response's region of support extends from t=0 until the respective line 40–44 crosses X-axis 32. Although FIG. 2 shows the CIR of Cat-5 twisted pair cables, other types of twisted pair cables can have the same overall impulse response, with the CIR's region of support and magnitude increasing with decreasing quality and vise versa.

It is evident from curves 40–44 that the normalized post-cursor ISI magnitude (the CIR after t=0) and duration increases with cable length. The cable length is therefore a direct function of the CIR amplitude.

Curves 40–44 show the low-pass nature of channel 16. The impulse responses are always positive and monotonically decreasing and can be crudely approximated with an inverse exponential function. It can be shown that for a typical twisted pair cable, a unique one-to-one function Φ exists that can map the amplitude of the CIR, h(t), at any time $t_0$, to the length of the cable, as represented by the following equation:

$$L = \Phi(h(t_0)) \quad 0 < t_0 < T \qquad \text{Eq. 4}$$

where T is the duration of the CIR (from t=0 to the time at which the CIR crosses X-axis 32). The above relation can be generalized to a mapping of any function of the channel's impulse response to the cable length:

$$L = \Phi(\xi(h(t))) \qquad \text{Eq. 5}$$

In other words, the actual impulse of the channel is not required in order to estimate the cable length L. Rather, any equation that is a unique function of the impulse response can be used. One example of such a function can be the mapping of post-cursor channel ISI power to cable length, as shown in the following equation:

$$L = \Psi\left(\int_0^\infty h^2(t) \cdot dt\right) \qquad \text{Eq. 6}$$

where the term within the parenthesis is post-cursor channel ISI power. The post-cursor ISI power is a unique function of the channel impulse response h(t).

For a digital implementation, the above equation can be rewritten as:

$$L = \Psi_d\left(\sum_{i=0}^{\infty} h^2(iT)\right) \qquad \text{Eq. 7}$$

where the summation term represents the CIR power. The first sample, i=0, is very large and can be excluded for increased transformation sensitivity, if desired. With the i=0 term excluded, the summation in Equation 7 represents the ISI power only.

Figure 3:
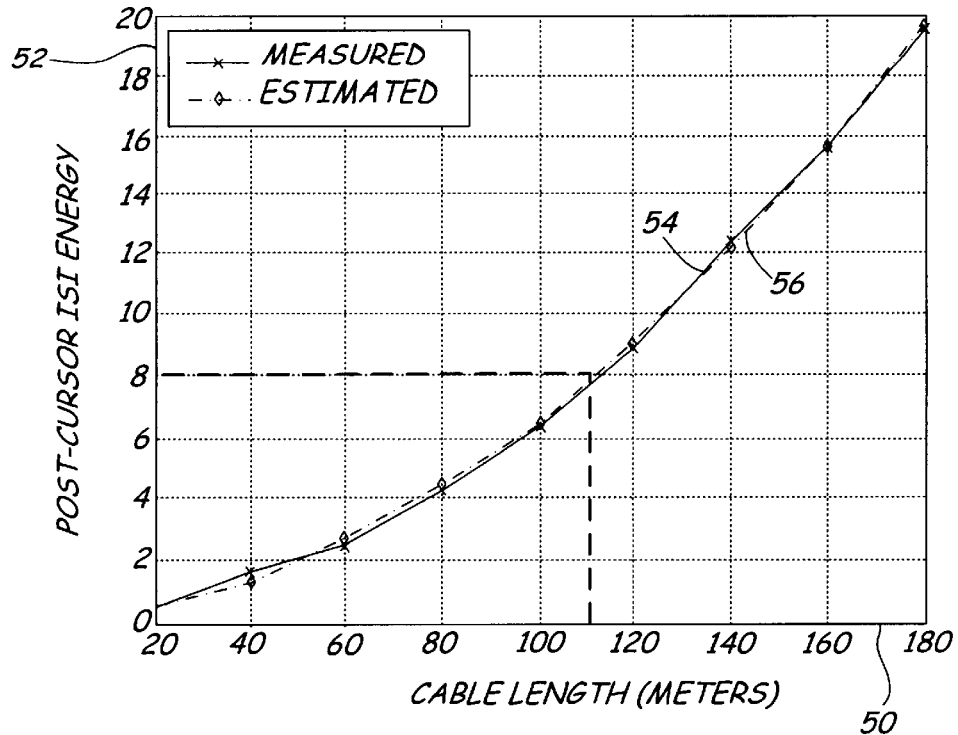
FIG. 3 is a graph showing the relationship between cable length and measured post-cursor Inter-Symbol Interference (ISI) power.

FIG. 3 is a graph showing the relationship between the cable length, on X-axis 50 and the post-cursor ISI power of FIG. 2, on Y-axis 52. Curve 54 represents the measured ISI power as a function of cable length for a typical twisted pair cable, and curve 56 represents an analytical fit of the measured data with the second order polynomial, $$P_{pc-ISI} = 0.005 * L_2 + 0.0141 * L \qquad \text{Eq. 8}$$

It can be seen from FIG. 3 that the actual ISI power and the estimated fit are very close. Therefore, the polynomial shown in the above equation can be exploited for accurate and efficient cable length estimation purposes. If the ISI power within the received data signal is known, the above polynomial can be used to calculate an estimate of the cable length.

Looking at FIG. 3, for example if the measured post-cursor ISI power (i.e. the summation term in Equation 7) is equal to "8", then the cable length is approximately 110 m. This mapping can be solved through the polynomial given in Equation 8 or through a representative look-up table.

An estimate of the cable length can therefore be based solely on an estimate of the channel ISI or, equivalently, the channel CIR. This method of estimating cable length can be used in any system where the CIR information is known. The CIR information can include previously known information about the channel or can be locally estimated within receiver 14 (shown in FIG. 1) during operation of the receiver. In the absence of a previously known CIR, receiver 14 can include any adaptive system, such as a decision feedback equalizer, that can give an estimate of the channel CIR or its causal portion. The local estimate of the channel CIR can then be used to estimate the channel cable length.

The following discussion describes two examples of methods for estimating the cable length as a function of the ISI power, according to alternate embodiments of the present invention.

1. Estimate of CIR is Available at Receiver

If an estimate of the channel impulse response, h(t), is available at receiver 14, such as when the receiver has an equalizer adapted to the particular channel, the channel length estimator in the receiver can simply use the relation:

$$P_a = \sum_{i=-\infty}^{\infty} h^2(i) \qquad \text{Eq. 9}$$

Since h(i) is known, all that is needed in the receiver is a device that squares each h(i) and adds them together. The resulting calculation of $P_a$ can then be mapped to an estimate of the cable length through an analytical expression such as that provided in Equation 8 or through a look-up table.

Taking advantage of the fact that most of the ISI energy of a twisted pair cable is causal (i.e., after t=0 in FIG. 2), the above expression can be simplified to:

$$P_a = \sum_{i=1}^{\infty} h^2(i) \qquad \text{Eq. 10}$$

The above equation is an accurate estimate of the total post-cursor ISI power representing the received signal power attenuation $P_a$ in the cable without effects of timing error.

An easier but less accurate method of estimating the signal power attenuation $P_a$ is to use only a limited number of samples of the ISI power given in the above expression, as shown in Equation 11:

$$P_a = \sum_{i=1}^{N} h^2(i) \qquad \text{Eq. 11}$$

where N>1. The calculation shown in Equation 11 can be implemented in hardware, software, or a combination of both hardware an software. For example, a digital signal processor can be used. The calculated estimate of the received signal power attenuation $P_a$ due to cable length can then be easily mapped to an estimate of the cable length. In one embodiment, only one or two samples of the ISI power is used for each symbol received by receiver 14.

2. Receiver 14 Locally Estimates the Channel CIR or its Causal Portion.

In the absence of a previously specified CIR, receiver 14 can include an adaptive system, such as a decision feedback equalizer, that can give an estimate of the CIR or ISI, which is sufficient to estimate the cable length.

A. Using DFE Feedback Tap Coefficients

If a decision feedback equalizer (DFE) scheme is used in receiver 14, with a non-overlapping feed forward equalizer (FFE) and DFE taps, the estimate of the causal ISI power is readily available since the DFE's steady-state feedback tap coefficients are equal to the CIR of the channel in a mean square sense. The DFE's feedback tap coefficients can be squared and then summed together to obtain an estimate of the post-cursor ISI power and, thus, the cable attenuation $P_a$ per equation 11.

B. Using DFE Output

A simpler and more efficient method of estimating the received signal power attenuation $P_a$ is to estimate the power $P_{DFE}$, at the output of the decision feedback equalizer. It can be shown that under certain conditions, this power is exactly equivalent to that of Equation 11 for an N-tap decision feedback equalizer.

If the signal received at receiver 14 (or at the input to the DFE), is denoted by x(i) and the steady state feedback tap coefficients within the DFE are denoted by b(i), then the power at the output of the DFE is:

$$P_{DFE} = E\left(\sum_{i=1}^{N} b(i) \cdot x(n-i)\right)^2 \qquad \text{Eq. 12}$$

where n is a variable'similar to time in a time-forward sense, N is the number of taps in the DFE and E represents the expected value of the summation term in Equation 12, squared. Expanding Equation 12 produces:

$$P_{DFE} = \sum_{i=1}^{N} \sum_{j=1}^{N} b(i) \cdot b(j) \cdot E(x(n-i) \cdot x(n-j)) \qquad \text{Eq. 13}$$

Assuming the transmitted data sequence, and hence its estimate x(i) at receiver 14 is wide-sense stationary, the above equation can be re-written as:

$$P_{DFE} = \sum_{i=1}^{N} \sum_{j=1}^{N} b(i) \cdot b(j) \cdot r_x(i-j) \qquad \text{Eq. 14}$$

where $r_x$ is the auto-correlation of the transmitted data sequence. The above equation can be re-written as:

$$P_{DFE} = \sum_{k=1}^{N} r_a(k) \sum_{i=1}^{N} b(i) \cdot b(i-k) \qquad \text{Eq. 15}$$

The second summation term in Equation 15 represents the channel auto-correlation function. The relationship in Equation 15 shows that the DFE power content $P_{DFE}$ is equal to the cross product of the transmitted data sequence auto-correlation function and the causal portion of the channel's auto-correlation function.

Assuming a proper convergence of the DFE (i.e., b(i)=h(i)), Equation 15 can be re-written as:

$$P_{DFE} = r_0 \cdot P_a + \sum_{k \neq 0} r(k) \sum_{i=1}^{N} b(i) \cdot b(i-k) \qquad \text{Eq. 16}$$

In Equation 16, the received signal power attenuation variable $P_a$ has been substituted for the ISI power term $$\sum_{i=1}^{N} h^2(i).$$

If the transmitted data sequence x(i) is uncorrelated, than the second term in Equation 16 will be zero. This will make Equation 16 similar to Equation 11 with a known scaling factor $r_0$, which is equal to the transmitted signal power. The DFE power content $P_{DFE}$ can therefore be readily mapped to a corresponding cable length estimate using the proper relationship.

If the transmitted data sequence is correlated, then the second term in Equation 16 will be non-zero. The DFE power $P_{DFE}$ will then be the cross product of the data and channel auto-correlation functions. Taking advantage of the well-behaved nature of the CIR (monotonically decreasing with time and always increasing CIR samples with cable length as evident from FIG. 2), a unique one-to-one mapping can be found between the cable length and the channel auto-correlation function so than the second term in Equation 16 can be subtracted out. Without loss of generality, a suitable mapping can be determined for any previously specified data auto-correlation function.

Figure 4:
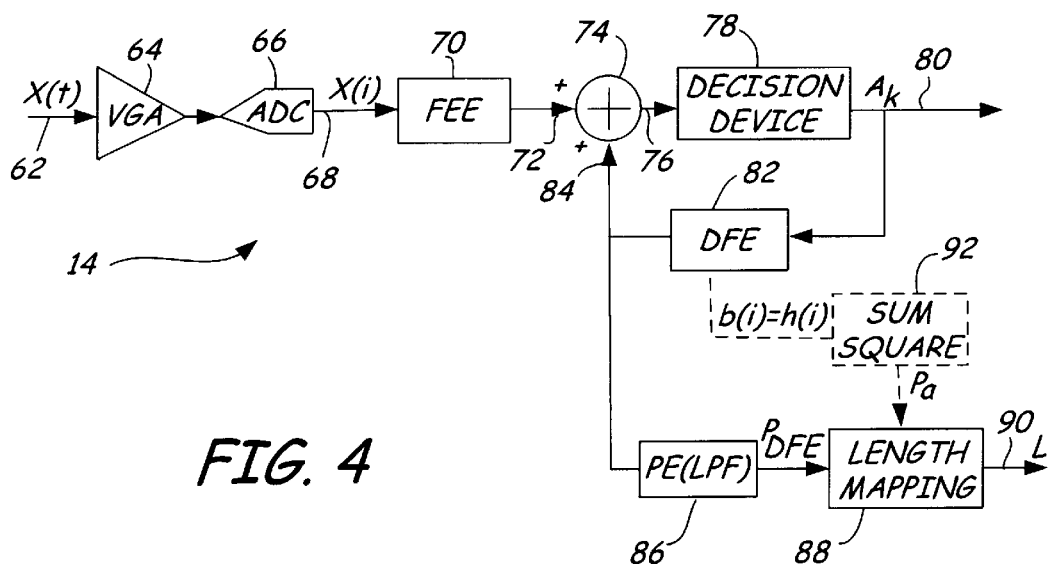
FIG. 4 is a block diagram of a communications receiver according to one embodiment of the present invention.

FIG. 4 is a block diagram of receiver 14 having a cable length estimator according to one embodiment of the present invention. Receiver 14 includes a data input 62 for receiving a transmitted analog data signal x(t) from channel 16 (shown in FIG. 1). Variable gain amplifier (VGA) 64 receives the transmitted analog data signal x(t) and amplifies the signal by a selected gain factor to produce an amplified analog data signal that is provided to the input of analog-to-digital (A/D) converter 66. The gain applied by VGA 64 is selected by an automatic gain controller (not shown) as is well-known in the art.

A/D converter 66 converts the amplified analog data signal into a series of digital values x(i) on output 68. The digital values x(i) are applied to a feed forward equalizer (FFE) 70, which is an adaptive equalizer that compensates for Inter-Symbol Interference due to the characteristics of channel 16 and receiver 14. The output of FFE 70 is coupled to a first addend input 72 of a summing element 74. Summing element 74 has an output 76, which is coupled to the input of a decision device or "slicer" 78. Decision device 78 generates an estimate $A_k$ of the actual transmitted symbol for each received symbol in data signal x(t) based on a decision or slicing mechanism, as is known in the art. For example, if a received symbol was close to a "1", decision device 78 would declare the detected symbol $A_k$ as a "1". If the received symbol was close to a "−1", decision device 78 would declare the detected symbol $A_k$ as a "−1.".

The detected symbols. $A_k$ are then applied to receiver output 80 and to the input of decision feedback equalizer (DFE) 82. DFE 82 is similar to FFE 70 and includes an adaptive equalizer, which compensates the string of detected symbols $A_k$ for ISI, as is known in the art. As discussed above, DFE 82 has N taps with feedback tap coefficients, b(i), which are ideally equal to h(i) of the channel impulse response after equalizer convergence. The output of DFE 82 is coupled to a second addend input 84 of summation element 74 and to the input of power estimator 86. Power estimator 86 can include an integrator or a low-pass filter, for example. Power estimator 86 essentially integrates the output of DFE 82 to measure the power content $P_{DFE}$ according to Equation 12 above.

As shown in Equation 16, the measured DFE power $P_{DFE}$ is directly proportional to the received signal power attenuation $P_a$ within cable 16 and can be easily mapped to a corresponding cable length estimate by length mapping device 88.

In one embodiment, length mapping device 88 includes a look-up table, which associates each of a plurality of different values of $P_{DFE}$ with a corresponding estimate of the length L of transmission channel 16. Length mapping device 88 then provides the length estimate to output 90, where the estimate can be used by various functions in receiver 14. In an alternative embodiment, length mapping device 88 implements an analytical expression, such as equation 8, which translates $P_{DFE}$ into the corresponding length estimate L. The analytical expression can be implemented in a hardware circuit or a digital signal processor, for example.

In an alternative embodiment, receiver 14 takes advantage of the fact that the steady-state feedback tap coefficients, b(i), of DFE 82, which are equal to the causal portion of the channel impulse response, h(i), are readily available within DFE 82. Each of the N feedback tap coefficients are provided to the input of sum square device 92 (shown in phantom), which squares each coefficient and sums the squares together a according to Equation 11 above to produce an estimate of the received signal power attenuation $P_a$ according to Equation 11 above. The estimated value of $P_a$ is then provided to length mapping device 88, which maps $P_a$ into a corresponding channel length estimate according to a look-up table or an analytical expression, such as Equation 8, for example.

Several alternative methods and apparatuses can be used to estimate the channel length based on any unique representation or estimate of the channel's impulse response. Only two examples are shown in FIG. 4. The channel length estimator can use an estimate of the total ISI energy or an estimate of only a portion of the ISI energy.

The channel length estimator of the present invention provides a means of accurately and effectively estimating the length of channels having low-pass filter characteristics, such as a twisted wire pair channels. The channel length estimator can be used in conjunction with any form of equalization that is used for such channels in a receiver. The method is very flexible and offers a designer many equivalent alternatives for estimating the cable length, depending on the specific requirements of the system and its application. The simplicity of the channel length estimator allows the estimator to be implemented with little computational complexity and additional hardware. This in turn allows significant hardware savings for implementations in application specific integrated circuits (ASICs) and a reduction in instructions and operations in processor-based systems.

Although the present invention has been described with reference to preferred embodiments, workers skilled in the art will recognize that changes may be made in form and detail without departing from the spirit and scope of the invention. For example, For example, the term "coupled" used in the specification and the claims can include a variety of connections, such as a direct connection or a connection through one or more intermediate elements. Also, the term "circuit" can refer to a hardware-implemented circuit or a software-implemented circuit or a combination of both.

What is claimed is:

1. A method of estimating the length of a communications channel transmission line that extends between a transmitter and a receiver and has a low-pass filter characteristic and an impulse response, the method comprising:
   (a) receiving a data signal by the receiver from said transmission line;
   (b) estimating the length of said transmission line as a function of the data signal received by the receiver and the impulse response; and
   (c) providing an estimate of the impulse response at the receiver, wherein the estimating step (b) comprises estimating the length of said transmission line at the receiver as a function of the estimate of the impulse response.

2. The method of claim 1 wherein:
   the providing step (c) further comprises estimating a representation of post-cursor intersymbol interference power within the data signal; and
   the estimating step (b) comprises estimating the length of the transmission line as a function of the representation of the post-cursor intersymbol interference power estimated in step (c).

3. The method of claim 2 wherein:
   the providing step (c) further comprises providing a predetermined estimate of the impulse response to the receiver and estimating the representation of the post-cursor intersymbol interference power of the transmission line from the predetermined estimate of the impulse response.

4. The method of claim 2 wherein the providing step (c) further comprises:
   generating a local estimate of the impulse response based on the data signal received by the receiver.

5. The method of claim 4 wherein the generating step comprises:
   estimating the post-cursor intersymbol interference power based on the relation, $$P_a = \sum_{i=1}^{N} h^2(i)$$

where $P_a$ represents the post-cursor intersymbol interference power, h(i) represents the estimate of the impulse response, i is an integer variable index that ranges from 1 to N, and N is an integer variable that is greater than or equal to 1.

6. The method of claim 5 wherein the step of estimating the post-cursor intersymbol interference power comprises:

applying a representation of the data signal received at the receiver to a decision feedback equalizer having N steady-state feedback tap coefficients denoted b(i), wherein each b(i) represents a corresponding h(i), for i=1 to N;

squaring each of the coefficients b(i) to generate N squared coefficients; and adding the N squared coefficients together to generate an estimate of the post-cursor interference power.

7. The method of claim 4 wherein the step of generating comprises:

receiver comprises applying a representation of the data signal received at the receiver to a decision feedback equalizer, which has an equalizer output;

integrating the equalizer output over time to generate a measurement of the power content at the equalizer output, which is a function of the post-cursor intersymbol interference power and the impulse response; and estimating the length of the transmission line as a function of the measurement of the power content at the equalizer output.

8. The method of claim 2 wherein the estimating step (b) comprises:

providing a look-up table, which associates each of a plurality of different intersymbol interference powers with a corresponding estimate of the length of the transmission channel;

applying the representation of the intersymbol interference power to the look-up table; and outputting the estimate of the length of the transmission line that corresponds to the representation of the intersymbol interference power.

9. The method of claim 2 wherein the estimating step (b) comprises:

implementing a polynomial equation within the receiver, which provides the estimate of the transmission line length as a function of the representation of the interference power;

applying the representation of the interference power to the polynomial equation and solving the polynomial equation for the estimate of the transmission line length; and outputting the estimate of the transmission line length.

10. A channel length estimator comprising:

a channel input for coupling to a transmission line having a length;

a decision feedback equalizer coupled to the channel input and comprising a plurality of steady-state feedback tap coefficients and an equalizer output;

a power estimator coupled either to the steady-state feedback tap coefficients or to the equalizer output and has an estimated power output; and a channel length mapping circuit, which is coupled to the estimated power output and is adapted to map the estimated power output to an estimate of the transmission line length.

11. The channel length estimator of claim 10 wherein:

the power estimator is coupled to the steady-state feedback tap coefficients and is adapted to generate a sum of the squares of the steady-state feedback tap coefficients, which forms the estimated power output.

12. The channel length estimator of claim 10 wherein:

the power estimator is coupled to the equalizer output and comprises an integrator.

13. The channel length estimator of claim 10 wherein:

the power estimator is coupled to the equalizer output and comprises a low-pass filter.

14. The channel length estimator of claim 10 wherein the channel length mapping circuit comprises a look-up table.

15. The channel length estimator of claim 10 wherein the channel length mapping circuit implements a polynomial equation, which relates the estimated power output to an estimate of the transmission line length.

16. A data communications receiver for coupling to a transmission line that has a low-pass filter characteristic and an impulse response, the receiver comprising:

a receiver input adapted to receive a data signal from said transmission line;

a receiver output;

a detected symbol flow path from the receiver input to the receiver output; and means coupled to the detected symbol flow path for providing an estimate of said impulse response at the receiver and for estimating the length of said transmission line as a function of the data signal received from said transmission line and the estimate of the impulse response.

* * * * *